Aug. 22, 1967 A. F. BROGLIO 3,336,849

PHOTOGRAPHIC COMPOSING APPARATUS

Filed April 19, 1965 7 Sheets-Sheet 1

INVENTOR
Attilio F. Broglio
BY
Richard F. Bennasch
ATTORNEY

PHOTOGRAPHIC COMPOSING APPARATUS

INVENTOR

BY

ATTORNEY

INVENTOR
Attilio F. Broglio
BY Richard F. Bernard
ATTORNEY

INVENTOR
Attilio F. Broglio
BY Richard F. Bannard
ATTORNEY

INVENTOR
Attilio F. Broglio
BY
Richard F. Bernard
ATTORNEY

INVENTOR
Attilio F. Broglio
BY
Richard F. Bannard
ATTORNEY

INVENTOR
Attilio F. Broglio
BY Richard F. Bauman
ATTORNEY 3,336,849

PHOTOGRAPHIC COMPOSING APPARATUS

Attilio F. Broglio, Woburn, Mass., assignor to Photon, Inc., Wilmington, Mass., a corporation of Massachusetts Filed Apr. 19, 1965, Ser. No. 448,943
7 Claims. (Cl. 95—4.5)

ABSTRACT OF THE DISCLOSURE

This invention is a high speed phototypesetter wherein the characters are carried on a continuously rotating drum and are arranged thereon in generally helical paths. Character spacing on the photosensitive output material is obtained by selecting the correct character in combination with selected axial movement of the drum.

The present invention relates to a photographic type composing machine and more particularly one wherein the master characters are arranged in helical positions on a rotating drum.

One object of the invention is to obtain a very high speed commercial photographic type composing machine.

Another object of the invention is to obtain extensive versatility in a relatively simple and inexpensive machine whereby the user may obtain an extensive number of different point sizes.

Still another object of the invention is to obtain high accuracy alignment and positioning of the characters where each character in a line is allocated.

Yet another novel feature of the invention resides in the moving carriage present in most phototypesetters, as described in Patent No. 2,670,665, is entirely eliminated.

These and other features of the invention will become evident in the description and the drawing wherein.

*General description*

Figure 1:
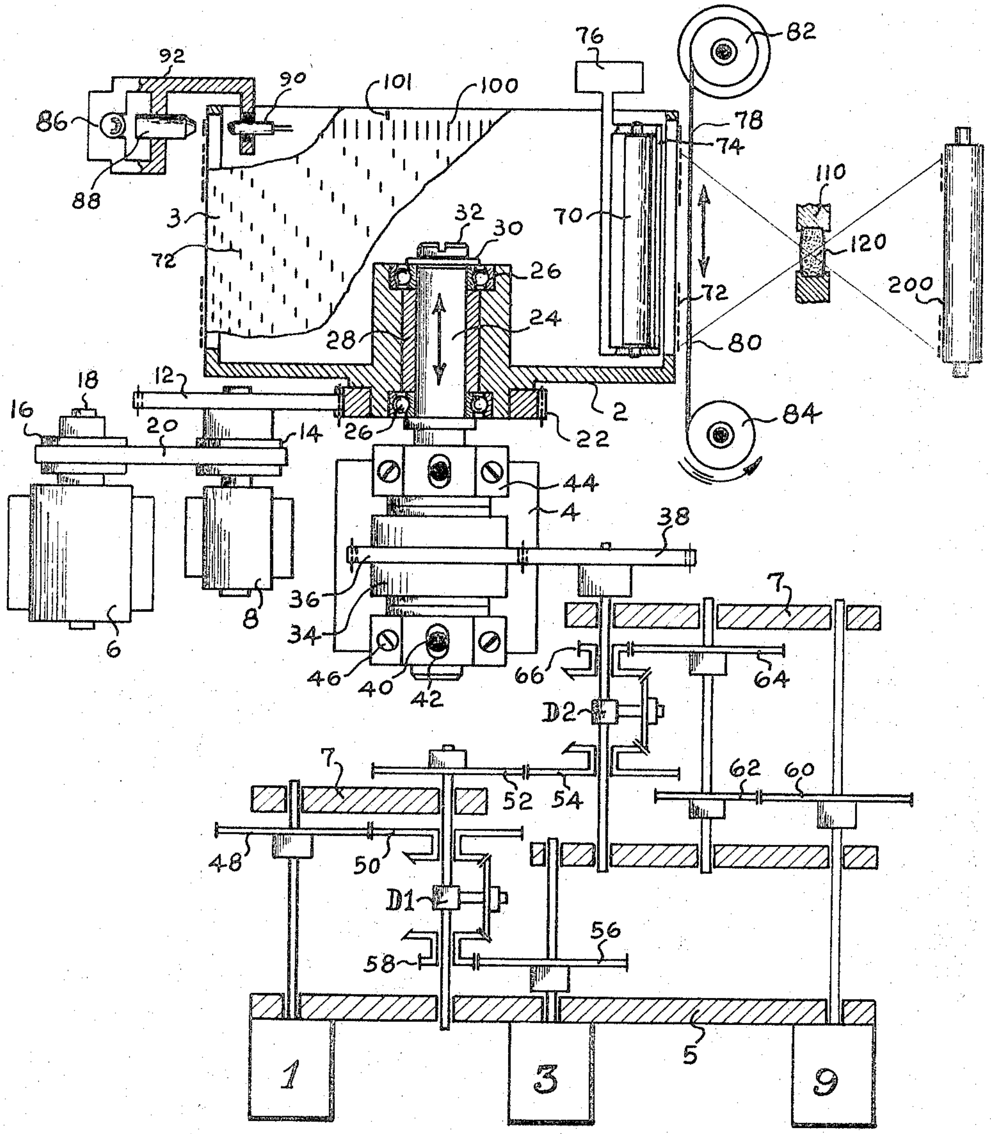
FIGURE 1 shows a top view of the principal element of the invention with a portion thereof broken away.

FIGURE 1 shows the principal elements of the invention. The revolving drum 2 carries a character matrix 3 upon which the characters are arranged in helical form. As the drum revolves, the position of the desired character is registered in the control circuit not shown here by reading the slits 100 and 101. When the desired character is in the correct position, the flash tube 70 is discharged illuminating the character on the matrix.

This character is projected through a masking aperture 80 through a lens 120 onto the photographic film 200. As the composition of the line progresses from the first character to the last, the shutter 78 carries the masking aperture 80 progressively transversely across the drum under control of the electronic control circuit.

As each character is flashed the drum is displaced in a direction parallel to the line being composed by a variable amount depending upon the width of the character being projected and the accumulated widths of the characters and justification spaces in the line.

*Mechanical system*

With reference to FIGURE 1 there is shown the drum 2 which is suspended by a frame 4, a driving motor 6, a bearing pillow bloc 8, with a shaft 10 carrying an idler gear 12, a pulley 14 which is driven by the pulley 16 pinned on the motor shaft 18 and a belt 20. Gear 12 meshes with the drum driving gear 22 which has a larger face than gear 12 allowing the axial displacement of the drum 2.

The drum 2 is rotating about the axle 24 on which have been preloaded precision ball bearings 26 along with an inner ring 28 to avoid axial displacement. With this mechanical system the drum 2 is free to rotate about its axle 24 and to follow the axial displacement as required during photographic transcription.

Figure 10:
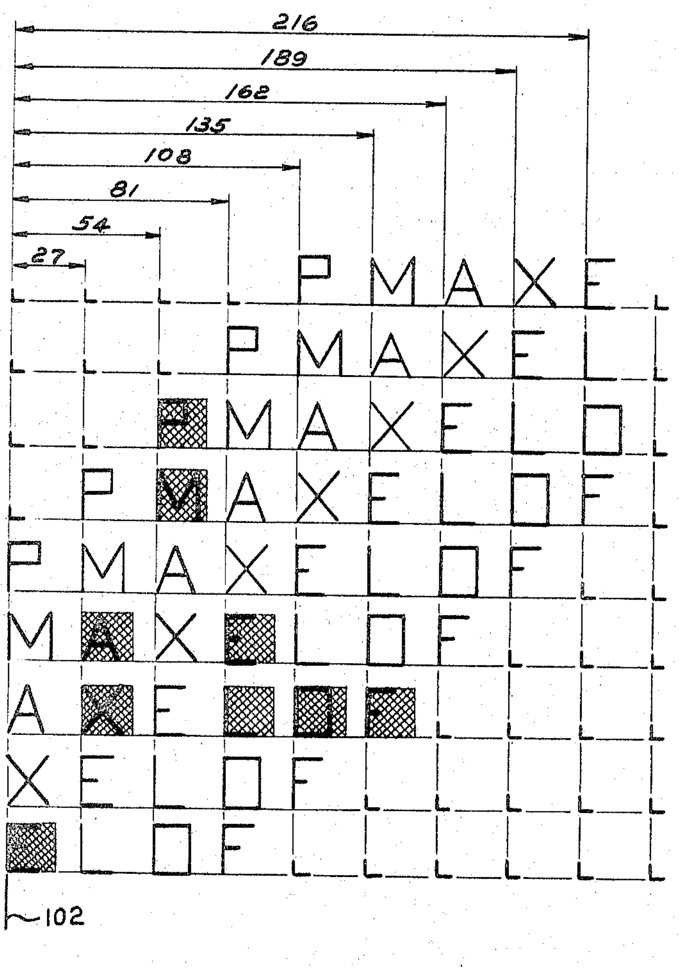
FIGURE 10 shows the position of the characters on the drum.
Figures 11, 12:
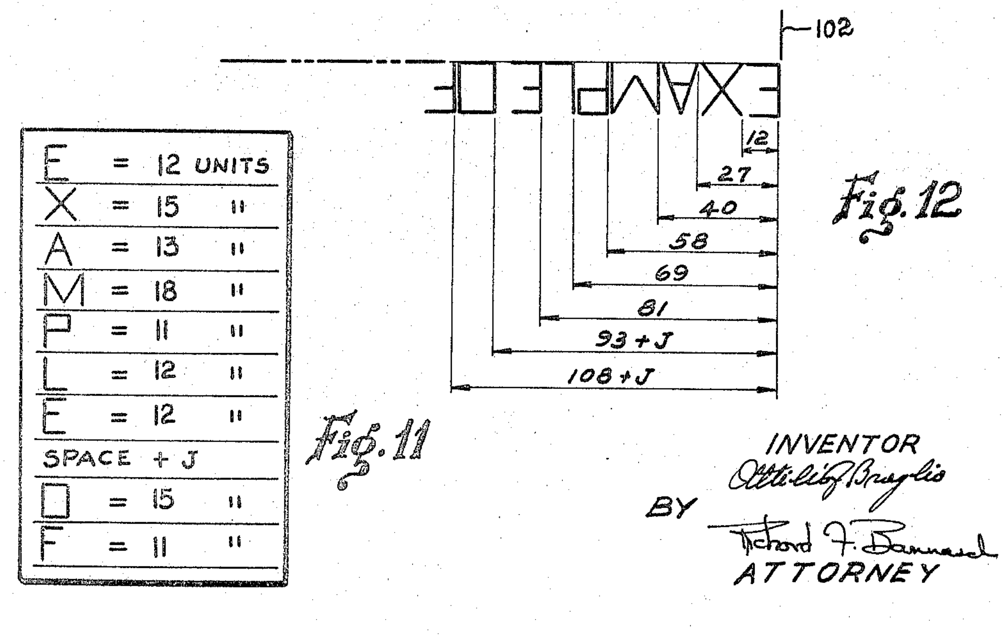
FIGURE 11 is a table of character width units.
FIGURE 12 illustrates the composition of a portion of a line upon the film.
Figure 13:
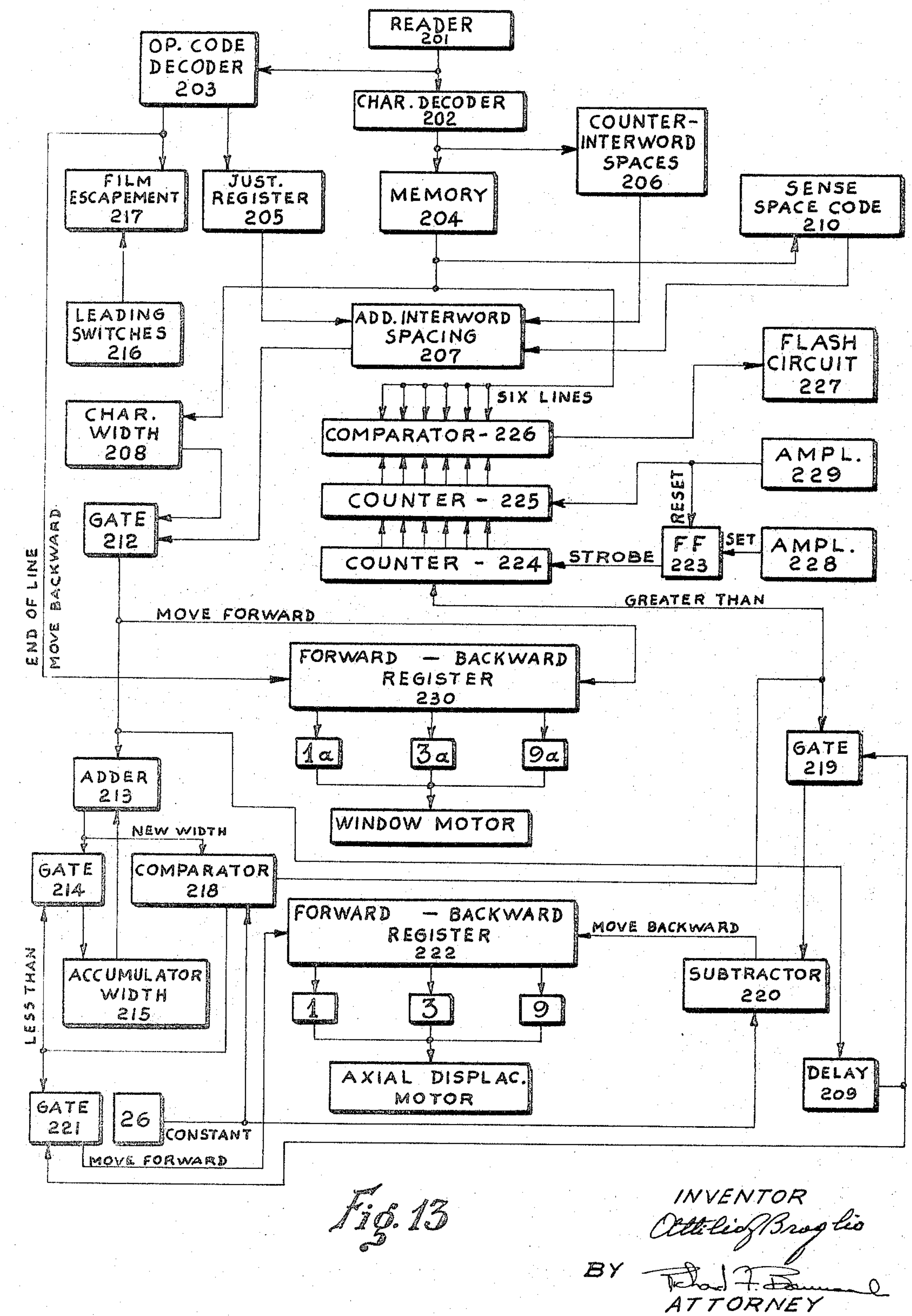
FIGURE 13 illustrates the electronic control system.

The drum 2 is subject to an axial displacement to add or subtract the character units as shown on FIGURE 10 and FIGURE 12, and more fully described hereinafter. To allow this axial displacement axle 24 is a part of a screw not shown on FIGURE 1, but in preloaded condition with a nut 34 which would rotate with gear 36 through a differential output gear 38. The axle 24 with screw and the nut 34 are commercial items of the type of Scully Jones antifriction ball screws. The axle 24 which is also part of the screw, carries two guiding pins 40 to prevent the axle 24 from rotating. Pins 40 slide in slots 42 cut on two ball bearing caps 44.

During photographic transcription nut 34 and gear 36 will receive the proper amount of rotation from gear 38 causing drum 2 to move axially, as required during photographic transcription. In order to drive gear 38 quickly and precisely, a differential mechanism is required which comprises three commercial stepping motors 1, 3 and 9. These stepping motors are of the type which are responsive to applied pulses of electrical power and function to rotate their shafts a discrete and precise amount for each pulse received. As will be more fully described therein-after, each character has a discrete width unit value, with one unit equal to 0.1170 millimeter. During the transcription process the drum 2 must be axially displaced in relation to the width of the characters photographed. As shown on FIGURE 1, motors 1, 3 and 9 mounted on frame 5 would operate as follows: In this mechanism each motor operates at a rate of 100 steps per revolution. Thus in FIGURE 1 each of the stepping motors 1, 3 and 9 when it receives an electrical impulse will rotate $\frac{1}{100}$ of a revolution or $\frac{3}{6}°$. These motors are geared to a multiple differential gear train containing differentials D1 and D2 mounted on frame 7.

The combined action of the stepping motors when translated by the gear train produces variable movement output gear 38 which meshes with gear 36 in one to one ratio. The minimum angular output of this variable movement occurs when motor 1 moves one step or $\frac{1}{100}$ of a revolution. This movement when translated through the gear train produces an output of 0.9° on gears 38 and 36. This means that gear 36 would rotate simultaneously with nut 34 forcing the screw and related axle 24 to move an axial displacement of one unit or 0.1170 millimeter.

The maximum angular output of this variable movement is produced when all three stepping motors 1, 3 and 9 each take two steps. This movement produces an angular output of 23.4° on gears 38 and 36. Therefore 23.4° will cause axial displacement of the drum equivalent to the maximum displacement.

This embodiment of the variable movement mechanism does not define limits to which the mechanism may operate. An addition of one or more stepping motors would result in finer incremental displacement of drum 2.

FIGURE 1 also shows a flash lamp 70 which is operated by the discharge of a condenser. The condenser discharge is triggered by a pulse generated at the appropriate instant by electronic control circuit described hereinafter. The flash lamp 70 may be a long single unit extending the length of the drum 2, or it may comprise two or more flash tubes.

Between the flash lamp 70 and master characters 72 a ground glass 74 is placed for an even display of the light on the surface area of the matrix where the characters 72 are located. The flash lamp 70 and the ground glass 74 are supported by a frame 76.

When a selected character is flashed, no other character must be projected through lens 120 onto film 200. Thus adjacent characters must be masked. This masking is accomplished by a steel band 78, similar to the commercial "Negator spring," located as near as possible to the drum. An aperture 80 in the steel band is of suitable size so that only one letter can be projected and all others are effectively masked. The steel band 78 is pulled by the rotating motion of a pulley 82 against the spring loaded action of pulley 84.

Figure 4:
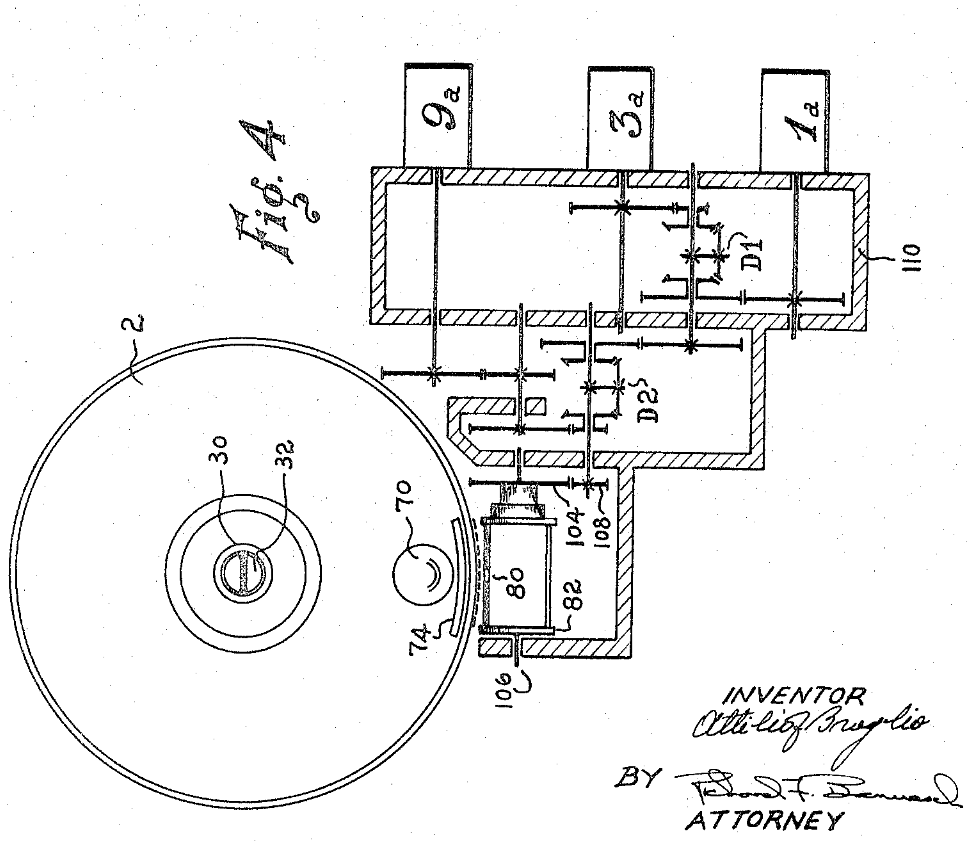
FIGURE 4 shows the window displacement mechanism which is similar to the axial displacement mechanism shown in FIG. 1

The pulley 82 is actuated by a differential stepping motor mechanism as shown in FIG. 4. This mechanism is very similar to that shown in FIG. 1 for moving the drum and is effective to quickly and accurately position the aperture in position for each character in a line of composition to be projected in sequence. As one character is generally projected once every revolution of the drum the aperture must be moved each revolution. Attached to pulley 82 is driving gear 104 which meshes with output gear 108 of the differential stepping mechanism. Gear 108 is driven by stepping motors 1*a*, 3*a* and 9*a*, attached to frame 110, through differentials D1 and D2. The stepping motors are actuated by pulses from the control circuit to provide the necessary output steps for a proper linear displacement of window 80. An example of the stepping sequences of these motors will be given in conjunction with FIGURES 10, 11 and 12.

*Character arrangement*

The drum 2 carries all the master characters 72 which are arranged in a helical form around the drum. Each character is repeated as many times as the desired length of line projected on film 200. There may be more than one type face on the matrix. In the preferred embodiment the characters are carried on a matrix 3 which may be photographic film which is bonded to the metal drum 2 as shown in FIG. 1.

Figure 2:
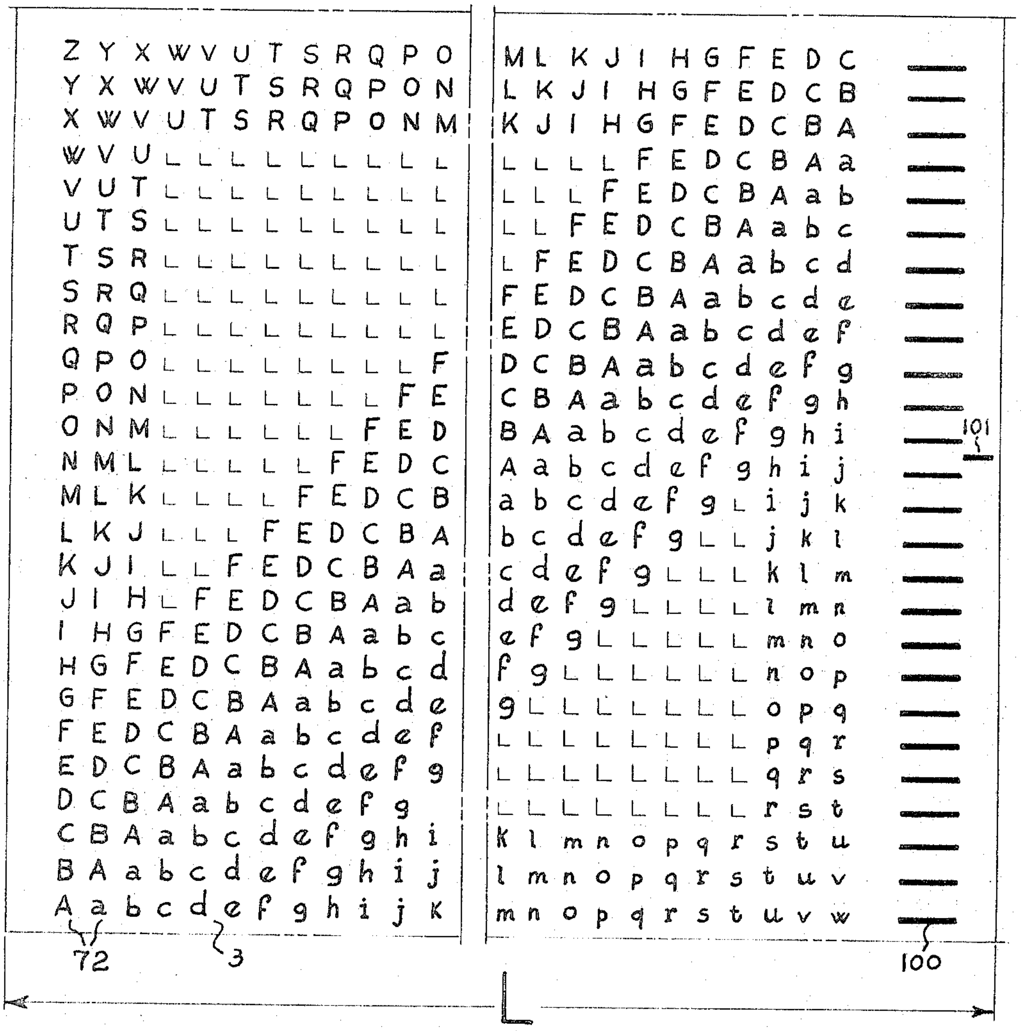
FIGURE 2 shows a portion of the matrix with the master characters thereon around the drum in linear development.

FIG. 2 shows a linear development of the master characters 72 around the drum in a helical form. For each base line of the character there is a related photocell slit 100 which adapted to generate a timing pulse for each character baseline around the drum.

Figure 3:
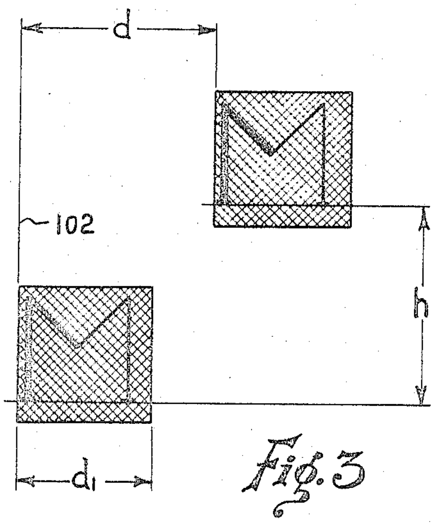
FIGURE 3 shows an enlarged view of two characters on the drum in their relative positions.

An enlarged view of the master character on the drum is shown on FIG. 3 where *d* represents the distance from character to character and it is equal to 27 units. The maximum value of the master character on the drum is eighteen units. Thus the minimum space between characters is 9 units. This space between characters is necessary to allow the aperture of the window 80 to be positioned with a slight margin of error. The height *h* from line to line around the drum is also larger than the height of the aperture of the window 80 for proper clearance of the character to be photographed.

*Character projection*

As previously mentioned, there is a photocell slit in the matrix 3 associated with each character baseline. As seen in FIG. 1, these slits are illuminated by a light source 86 and a microscope 88 which are held in a frame 92. On the opposite side of matrix 3 is a photodiode 90 which generates an electrical signal to the control circuit each time a slit passes. In addition to the slits 100 there is a reset slit 101 which is effective to emit an electrical signal to the control circuit once every revolution.

As was said in connection with FIG. 3, each character has a reference line 102 which represents the space from the other character by the distance *d*. Each reference line 102 is concentric to the axis and the first one would represent the starting point of the line on the film. As shown on FIGURE 12 the first character to be photographed would be "E." The next one would be "X" and it is 27 units from the reference line of "E" which has a value of 12 units, thus it has to be shifted by the drum displacement of 15 units to the left. This drum displacement occurs when motor 3 takes two steps or 6 units and motor 9 one step or 9 units as described in conjunction with FIGURE 1. As it is noted in the table of FIG. 11, character "X" has 15 width units which added to the 12 units of character "E" previously photographed gives a total of 27 units which also represents the distance between character reference lines 102. The next character to be photographed is "A" and its reference line was 15 units distant at the moment "X" was photographed, so the drum 2 will be shifted back to its original position. Motors 3 and 9 will repeat the stepping sequence in reverse. After character "A" is photographed, the next one would be "M." Because "A" was photographed with the drum 2 on its starting position, the character "M" was 27 units from character "A," thus considering the width value of "A" equal to 13, the distance that the drum has to be shifted to the left will be 14 units. At this time character "M" may be photographed, but not before motor 1 takes two steps and motors 3 and 9 one step each to complete the displacement of drum 2. When character "M" has been photographed drum will be shifted back 18 units, four units more to the right of reference line 102. This means that the next character to be photographed must be on the same reference line of the previous one. The drum displacement to the right would be performed completely by motor 9 taking two steps. At this point character "P" may be photographed and its reference line is 27 units from the next character "L." So character "P" having 11 units width the drum 2 must be shifted to the left 16 units. Motors 1 and 9 would take one step each while motor 3 would take 2 steps. At this point character "L" may be photographed. Because character "L" has 12 units width the drum will be shifted back to the right of 12 units with motors 3 and 9 taking one step each, it will fall at its starting reference line, so the next character "E" will be photographed with drum 2 in its original position. The width of the interword space after the character "E" may vary according to the justification requirements as determined by the control circuit. So the drum would move an appropriate number of units through actuation of the motors 1, 3 and 9. So the reference line of next character "O" will be in position to be projected in a line of composition after the appropriate justification space. Character "F" will be next to be photographed and so on. It should be kept in mind that the drum 2 will never move more than 26 units from its reference line because of 27 or more units is desired one or more columns of characters is skipped. Motors 1, 3 and 9 operate in 4 milliseconds per step and only two steps per motor are required for each displacement of the drum 2, thus it becomes evident the speed on which the embodiment of the machine would operate is high.

*Optical system*

Figure 6:
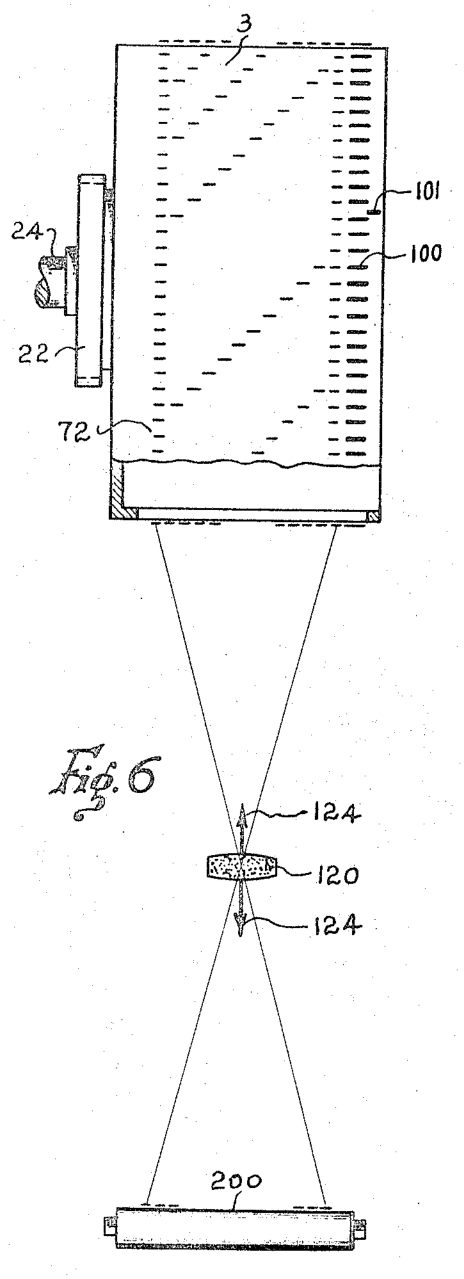
FIGURE 6 shows a partial top view of the drum and a lens and indicates lens movement for magnification change.

As shown in FIG. 1 the simplest form of this invention has only one fixed lens 120 so placed to give the desired character size on the film. However, such an arrangement will only give one point size to the characters on the film. If it is desired to give different point sizes, the lens may be moved as indicated by the arrows in FIG. 6 by a suitable mechanism.

Additionally the line length desired may be sufficiently long so that a fixed lens will not be adequate to cover the entire field.

Figure 5:
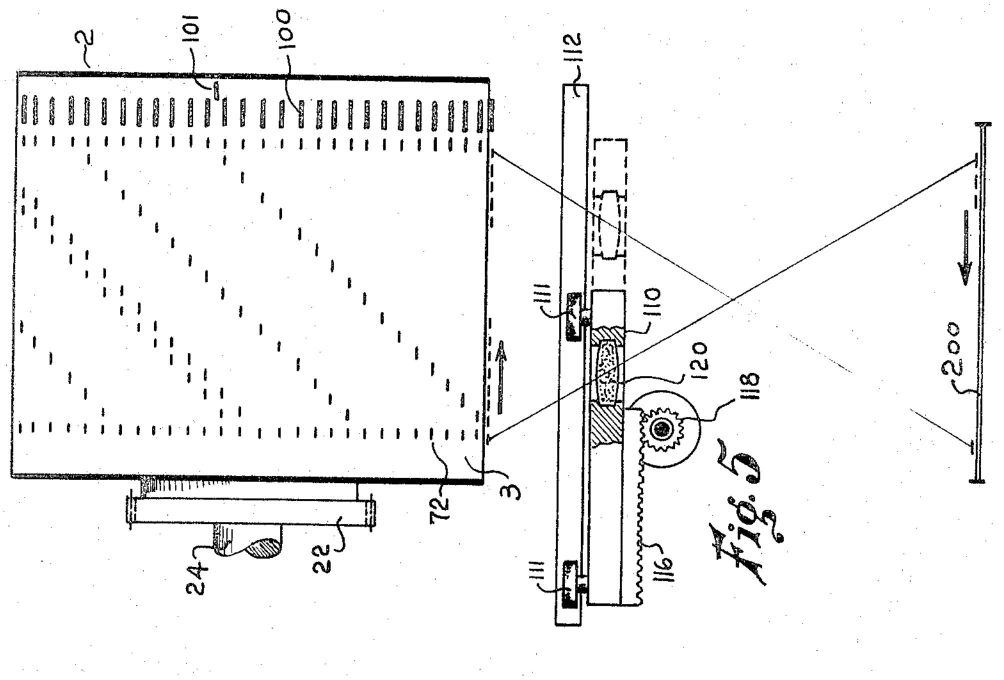
FIGURE 5 shows a partially top view of the drum and movable lens carriage.
Figure 7:
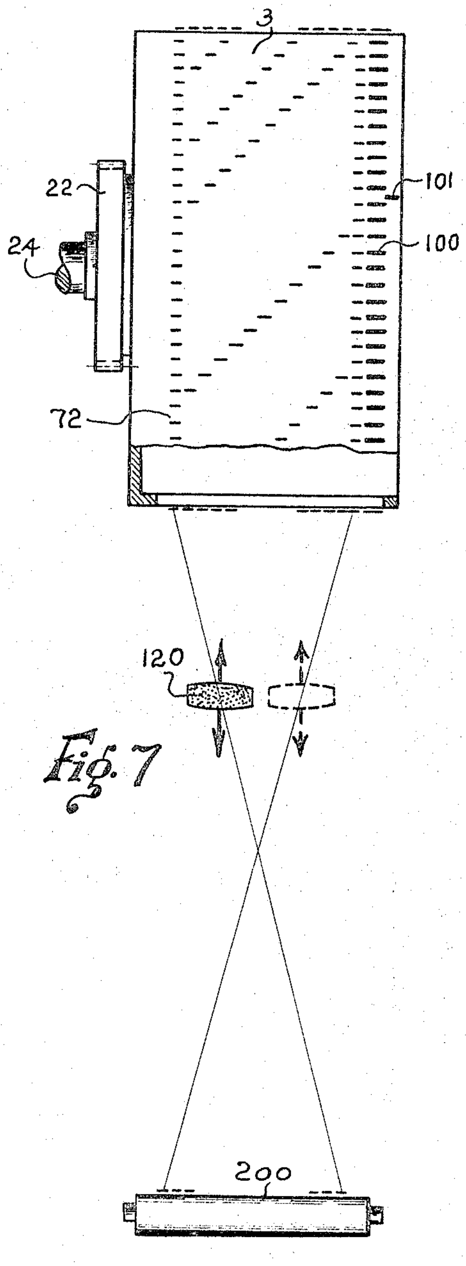
FIGURE 7 shows a partial top view of the drum and a reciprocating lens motion with magnification change.
Figure 8:
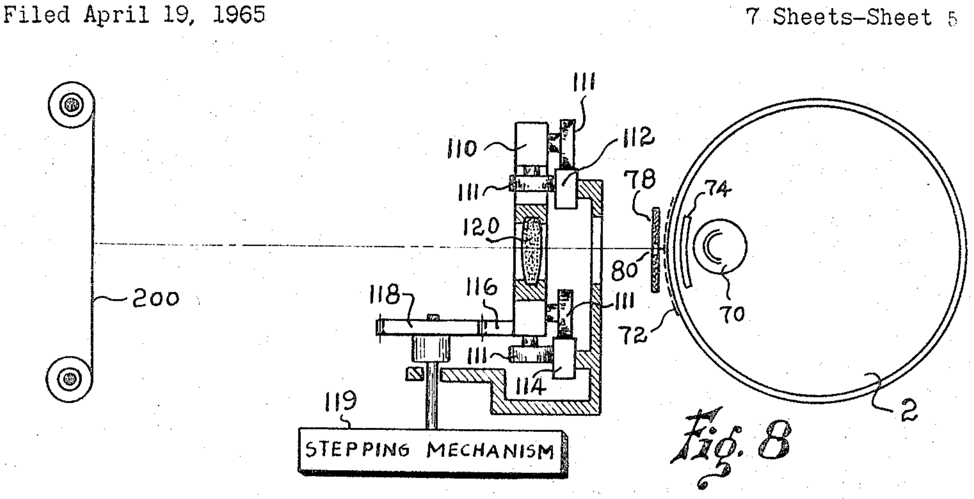
FIGURE 8 shows a partial side view of the drum with flash tube, lens and image projection film.
Figure 9:
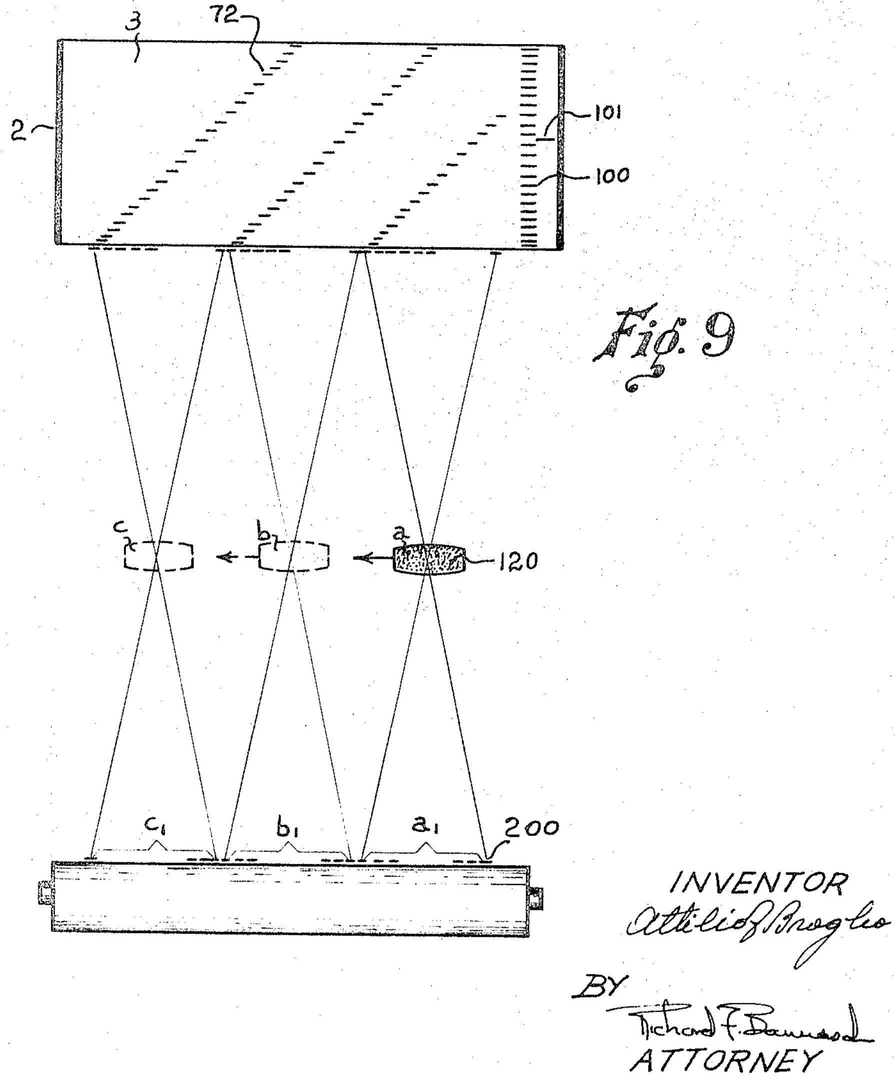
FIGURE 9 shows a top view of an embodiment of the invention for photographing more than one line at a time.

In FIG. 5 is shown a partial top view of the drum 2 with a lens carriage for intermittent motion of lens 120 in a long line transcription. The carriage 110, also shown on FIGURE 8, slides on rollers 111 over rails 112 and 114, through rack 116 driven by gear 118 through the stepping mechanism 119 similar to that used for intermittent displacement of the window 80. This system may be used when a large magnification of the image is requested. The lens carriage would travel the minimum amount necessary to obtain a satisfactory image on film 200. Also this system may be used in conjunction with FIGURE 9 where the lens 120 would move from position *a* to positions *b* and *c*. But once the lens 120 is in either position *a*, *b*, or *c* a complete line may be photographed on film 200 of a length $a_1$, $b_1$ and $c_1$. Also a different point size may be obtained with use of a lens similar to the zoom lens which would move on the direction of arrows 124. For a long line transcription with different point size an alternative motion of lens 120 is shown on FIGURE 7. In this case lens 120 would be mounted in the same manner as shown on FIGURE 8 and it would be subject to an alternative displacement through as stepping mechanism 119. In this case lens 120 would move and stop a certain amount to cover the maximum number of characters on drum 2 to be photographed before taking another step and stop for the same purpose as described in conjunction with FIGURE 9.

*Electronic control circuit*

The axial movement of the drum and the escapement of the window, are controlled by the electronic portion of the unit. Two more parameters controlled by the electronics are the flashing of the tube for exposing characters onto film and film escapement at the end of the printed line.

Characters are read from perforated paper tape by the reader, 201 and decoded in character decoder 202 if it is a printable character, and OP code decoder 203, if it is a function code. The character decoder, 202, will change the code into the machine's own internal code structure and store it into memory unit 204. An interword space will have its own code and stored in memory. Each interword space will be counted by 206, for justification purposes. The justification register, 205, will store the number of justifying spaces to be added to the interword spacing.

When a complete line has been read in, printing will then commence. As previously explained, the axial movement of the drum is a maximum of 26 units, whereas the window movement is continuous in one direction until the end of the printed line is reached. As each character is read from memory, its width is looked up in a width table, 208. The width in basic units, passes thru gate 212, and is read into forward/backward register 230. To move the window in the shortest amount of time, three stepping motors, 1A, 3A and 9A are utilized. Motor 1A steps the window one basic unit, 3A steps the window three basic units, and 9A, nine basic units. The motors step simultaneously. This means that the maximum number of steps a motor will take for each movement of the window is two. The forward/backward register will accept the count and pulse the correct stepping motor.

Interword spacing moves the window in the same manner. The amount is determined by the additional interword spacing 207, plus the basic number. Each interword space has a basic number of units. The number of interword spaces has been counted by 206. The number of units needed to justify is in register 205. The number of of interword spaces is divided into the number of justifying spaces needed. Each interword space is then increased by this amount. When a space code is read from memory, sense space code 210, causes the additional interword spacing 207 to add the correct amount.

The axial displacement of the drum, requires a maximum movement of 26 basic units. If the next character's width added to the present number, exceeds 26 the drum will then be moved back to some computed position. The width values read from gate 212, are added at 213 with the previous accumulated widths which are stored in 215. The total is read into comparator 218, and compared with a constant 26. If the new total is less than 26, it allows the width value which has been delayed by 209, to be read thru gate 221. It then is read into the forward/backward register 222. This register works in the same manner as 230 which was previously described. The new total is also read back into 215 via gate 214.

If the new total is greater than 26, the comparator 218 will allow the width from delay 209 to pass thru gate 219 and into the subtractor 220. The width is subtracted from 26. The answer is read into the forward/backward register 222 and moves the axial displacement of the drum backwards this amount. The drum now will be in the correct axial placement for the character to be exposed.

When the data is read from memory, 204, it is also read into comparator 226. Amplifiers 228 and 229 are the reference signals read from photo diodes for referencing the character location on the drum. They are read into counters 224 and 225, compared in 226 with the data, and flashes the flash lamp circuitry 227, at the appropriate time.

Flip-flop 223, is used to strobe the count in counter 224 into counter 225. The flip-flop 223 is set by the drum reference, amplified by 228. This set condition will strobe counter 224, into counter 225. The flip-flop is then reset by the first character reference from amplifier 229. Counter 224 is advanced each time the unit moves to a new row of characters on the drum by comparator 218. The characters being in helical form on the drum necessitates the presetting of counter 225 by counter 224, so that the characters will look like they appear to be in the same position in the comparator.

When the end of the printing is sensed, the end line code is utilized to advance the film, 217 and move the window back to the beginning of line via 230. The number of units the film is to lead is predetermined by leading switches 216.

I claim:

1. In a photographic composing apparatus a continuously rotating drum, a matrix on said drum containing transparent alphanumeric characters, a drum displacement means adapted for variable axial displacement of the drum, a light source arranged to selectively illuminate the characters on said matrix, a mask adapted to mask all illuminated characters except a selected one, said mask adapted for transverse movement in a direction parallel to the axis of the drum, a lens positioned to project the said one illuminated character exposed by the mask, a photosensitive material positioned to receive the image projected by the lens, an electronic control circuit adapted to receive information defining a line of composition and initiate displacement of said drum and mask and actuate said illuminating means whereby the characters in the line of composition are successively imaged on the said photosensitive surface.

2. The apparatus of claim 1 wherein the matrix contains characters arranged in a helical form around the drum.

3. The apparatus of claim 2 wherein each helical element comprises the same character repeated.

4. The apparatus of claim 1 wherein the drum displacement means comprises at least two stepping motors, a differential mechanism driven by said stepping motors, an output gear driven by the differential mechanism, an input gear integral with a threaded nut and meshed with the said output gear, an axle threaded into said nut, restraining means adapted to restrain the axle from rotational movement while allowing axial movement.

5. The apparatus of claim 1 wherein the mask comprises a band of opaque material, an aperture in said band, a take up pulley effective to wind and unwind the said band, a tension means effective to maintain the band in tension, and input gear connected to said take up pulley, a differential output gear meshing with said input gear, a geared differential gear train connected to said differential output gear, at least two stepping motors adapted to drive the differential gear train.

6. In a photographic composing machine the combination of a continuously rotating matrix carrying a plurality of characters, said characters being arranged in rows parallel to the axis of rotation in such a fashion that identical characters form a helical element on the face of the matrix, matrix displacement means adapted to cause precise axial displacement of the matrix, projection means effective to image a selected matrix character in an image plane, a photosensitive material in the image plane support means to hold said photosensitive material stationary during the projection of an entire line of composition, an electronic control means adapted to receive information defining a line of composition and cause the successive projection of characters comprising the line of composition onto the photosensitive material.

7. The combination of claim 6 wherein the projection means comprises an intermittent light source adapted to illuminate at least one matrix character at a precisely selected moment, a light directing means effective to limit projection to only one selected character, an optical element adapted to image the selected character in an image plane.

References Cited

UNITED STATES PATENTS

| | | | |
|---|---|---|---|
| 2,646,732 | 7/1953 | Offeman | 95—4.5 |
| 2,896,523 | 7/1959 | Tansel | 95—4.5 |

JOHN M. HORAN, *Primary Examiner.*